United States Patent [19]

Matsushima et al.

[11] 4,452,926

[45] Jun. 5, 1984

[54] RESIN-COATED SAND COMPOSITION AND METHOD FOR PRODUCING SAME

[75] Inventors: Noriaki Matsushima; Yukio Saeki; Hajime Kirabayashi, all of Fujieda, Japan

[73] Assignee: Sumitomo Durez Company, Ltd., Tokyo, Japan

[21] Appl. No.: 439,524

[22] Filed: Nov. 5, 1982

[30] Foreign Application Priority Data

Nov. 10, 1981 [JP] Japan .................... 56-180526

[51] Int. Cl.$^3$ .................................................. C08K 5/02
[52] U.S. Cl. ........................................ 523/145; 524/509; 428/407
[58] Field of Search ................. 523/145; 428/407; 524/509

[56] References Cited

U.S. PATENT DOCUMENTS

| | | | |
|---|---|---|---|
| 4,157,993 | 6/1979 | Funabiki et al. | 523/145 |
| 4,290,928 | 9/1981 | Funabiki et al. | 523/145 |
| 4,345,003 | 8/1982 | Matsushima et al. | 523/145 |

*Primary Examiner*—Lewis T. Jacobs
*Attorney, Agent, or Firm*—James F. Tao; James F. Mudd

[57] ABSTRACT

An improved resin binder for shell-molding operations having improved shake-out properties is disclosed. The resin binder utilizes a lubricant-containing phenolic resin of the novolac or resole type, or a mixture of novolac and resole types, incorporated therewith is an organic chloride. The organic chloride is characterized by having 20% by weight of the heating loss in the temperature range of 130° to 550° C. The organic chloride may be selected from chloride-containing polymers and cyclo-organic chlorides. Chlorinated polymeric material may be selected from polyvinyl chlorides, polyvinyldene chloride resins, chlorinated paraffins and chlorinated polyolefins.

27 Claims, 1 Drawing Figure

RESIN-COATED SAND COMPOSITION AND METHOD FOR PRODUCING SAME

BACKGROUND OF THE INVENTION

The present invention relates to an improved resin coated sand to be used in a shell-molding process. In conventional sand-molding operations, a mixture of sand coated with binder is placed in the mold, and the heat of the processing steps causes reactions to occur between the binder components to improve the pressed strength of the sand and retain the configuration of the part to be cast. After introduction of the molten metal into the cavity, the heat of the metal, during the cooling cycle is transferred to the sand-binder mixture causing the binder to be destroyed to a degree that allows the sand to be removed from the cast metal in an efficient manner.

In the automobile industry, the trend of manufacturers has led to the replacement of iron and steel castings with lighter weight metals such as aluminum, magnesium and their alloys. These castings are produced by sand-molding processes, but occur at lower temperatures than iron castings. The use of conventional binders, at these lower temperatures, have created problems in the removal of the sand particles from the castings due to the failure of the binder to be decomposed.

In the case of iron casting, the stock temperature of shell-mold reaches 800°–1000° C. at pouring, and the strength of shell-mold is naturally reduced after casting because almost all the phenolic resin binder is subjected to thermal degradation by the intense heat at pouring. Accordingly it is easy to remove the mold-core from molded articles in the form of said grains after casting.

For metals having a lower melting temperature, such as aluminum and magnesium, the stock temperature of shell-mold at pouring is rather low, approximately 300°–400° C. This results in an incomplete thermal degradation of the phenolic resin binder. Since conventional shell-molds have retained superfluous strength after casting for this reason, there have been extreme difficulties particularly for complicated mold structures, in removing the core efficiently from molded articles. In these cases, flogging is required so as to crush the molds even after time-consuming calcination thereof in a furnace to remove the occulded core therefrom. Flogging is a term used to indicate a tapping or impact force applied to the castings to remove the particulate sand particles leaving a clean cast structure.

After much investigation to improve the shake-out property of shell-molds after casting metals having a lower melting temperature, such as aluminum, the inventors have found that the shape-out property of cast shell molds is greatly improved by using a resin-coated sand produced by coating foundry sand with a lubricant-containing phenolic resin with the presence of one or more organic chlorides having 20% by weight of heating loss in the range of 130°–550° C. The organic chlorides may be selected from chlorine containing polymers and cyclo-organic chloride compounds.

An object of this invention is to improve the shake-out properties of shell-molds after casting.

An additional objective of this invention is to develop a process that will allow the economical reuse of the sand or aggregates used in the shell-molding processes.

SUMMARY OF THE INVENTION

An improved resin binder for shell-molding operations having improved shake-out properties is disclosed. The resin binder utilizes a lubricant-containing phenolic resin of the novolac or resole type, or a mixture of novolac and resole types, incorporated therewith is an organic chloride. The organic chloride is characterized by having 20% by weight of the heating loss in the temperature range of 130° to 550° C. The organic chloride may be selected from chloride-containing polymers and cyclo-organic chlorides. The chlorine-containing polymers should contain in its main chain the following structure

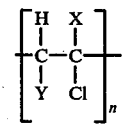

where:
X is selected from H, Cl and alkyl groups
Y is selected from H, Cl, alkyl and phenyl groups
n is an integer, 2 or greater.

Polymers selected from polyvinyl chlorides, copolymers thereof, chlorinated paraffins, chlorinated polyolefins are suitable. Cyclo-organic chloride such as dodecachloro-dodecahydrodimethone-dibenzo cyclooctene are disclosed.

DETAILED DESCRIPTION OF THE INVENTION

Figure 1:
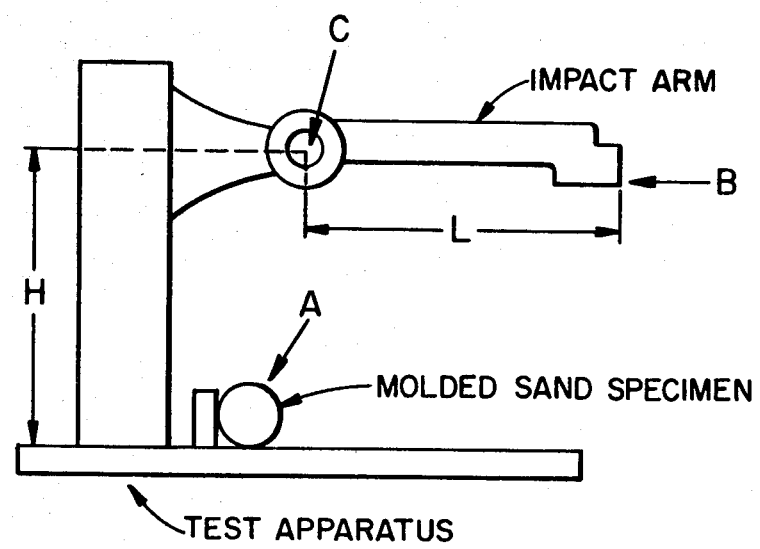
FIG. 1 is a side view of the test device used to determine the shake-out property of the cured resin coated sand.

In order to improve the shake-out property after casting metals having a low melting temperature such as aluminum, the chemical crosslinking structure of cured phenolic resin binders must thermally be degraded and cracked at a relatively lower temperature range of 300° to 400° C. In ordinary phenolic resins, whether they be novolac type or resole type resins, said chemical crosslinking structure therein consists of such as methylene, methine and dimethylene-ether groups. Among them, the dimethylene-ether group changes by heat to a methylene group. On the other hand, both the methylene and methine groups are stable to thermal decomposition, and they require much more energy for decomposition. Both the methylene and methine groups gradually begin to decompose at about 250° C., however, a higher, temperature range of 600° to 1000° C. is necessary for rapidly decomposing the major portion thereof. The thermal decomposition of phenolic resins is thought to be a thermal oxidative process whether exposed to either an oxidative or inert atmosphere. In an inert atmosphere, it is thought that much of the oxygen contained therein contributes to initiation of a oxidative reaction. It is further thought that both methylene and methine groups change to hydroperoxides due to said thermal oxidation, and finally yield carboxylic acids through cracking of dihydrobenzophenone. Accordingly, in order to lower the activation energy of decomposition reaction of methylene and methine groups, namely, to lower the decomposition temperature of phenolic resins to the range of 300° to 400° C., incorporating a compound having a catalytic effect thereof is an effective method for causing a thermal disintegration of the sand mold. The additives suitable for the purpose will generally be several kinds of oxidants.

The inventors have discovered that the presence of one or more organic chlorides, having the 20 percent by weight of the heating loss in the temperature range of 130° to 550° C., improve the shake-out property of the shell-molds. The heating loss according to the present invention is determined as follows: 20 mg each of an organic chloride (specimen) and aluminum oxide (as a standard substance) are charged into each dish of a thermogravimetric analyser. The temperature around both specimen and the standard substance is elevated by the rate of 10° C./min. under natural convection of air. When the thermal decomposition occurs, beam of the analyser at the specimen declines due to the weight loss of the specimen. This change is detected electrically, and the weight remaining proportion at each temperature to the initial 20 mg of the specimen is continuously and automatically plotted in a graph at the temperature-elevating rate as the corresponding trace of the weight loss. Therefore, the heating loss at a temperature in percent by weight is defined by subtracting the weight remaining proportion thereof in percent from 100.

Organic chlorides, indicate the 20 percent by weight of the heating loss in the temperature range of 130° to 550° C. determined by a thermo-gravimetric analyser, improves the shake-out property of the shell molds. When the temperature causing a 20 percent by weight of the heating loss is less than 130° C., the decomposition temperature of such organic chlorides affects a phenolic resin contained in resin-coated sand to decompose thermally prior to forming a cured three-dimensional structure. This results in lowering the initial strength as well as impairing a good shake-out property of the shell-molds. When the temperature causing a 20 percent by weight of the heating loss is more than 550° C., the decomposition of organic chlorides contributes to an incomplete decomposition of the three-dimensional structure in said phenolic resin. Therefore, this results also in impairing a good shake-out property of the shell-molds. Furthermore, when the heating loss of organic chlorides is less than 20 percent by weight within the temperature range of 130° to 150° C., an incomplete thermal decomposition of the three-dimensional structure in said phenolic resin also impairs a good shake-out property of the shell-molds.

The inventors have found that, within organic culorides having the 20 percent by weight of heating loss in the temperature range of 130° to 550° C., those of chlorine-containing polymers having the following formula in the main chain, and cyclo-organic chlorides improve the better shake-out property of the shell-molds:

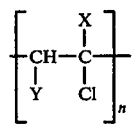

where:
X is selected from H, Cl, and alkyl group
Y is selected from H, Cl, phenyl, and alkyl group
n is an integer, 2 or greater.
Said chlorine-containing polymers are preferably polyvinyl chloride resins, polyvinylidene chloride resins, chlorinated paraffins and chlorinated polyolefins. Said polyvinyl chloride resins comprise not only a polyvinyl chloride resin, but copolymers of vinyl chloride with one or more of styrene, methylacrylate, acrylonitrile, vinylidene chloride, maleic anhydride, isobutyl, vinyl ether, allyl acetate, vinyl acetate, isobutylene, isopropenyl acetate, etc. Among said chlorine-containing polymers, more preferable are polyvinyl chloride resins having an average molecular weight of 600 to 2500, chlorinated paraffins having an average molecular weight of 500 to 2000 and chlorinated polyethylenes having an average molecular weight of 10,000 to 300,000. Among cyclo-organic chlorides, dodecachloro-dodecahydrodimethone-dibenzo cyclo-octene is preferable.

The inventors have found that incorporating said organic chlorides into lubricant-containing phenolic resins can further accelerate the shake-out property of shell-molds without lowering the initial strength thereof, more than incorporating them into lubricant-less ones. The reason for this may be a synergism that lubricants contained in phenolic resins accelerate thermal decomposition of said phenolic resins by said organic chlorides when incorporated thereinto. The mechanism of said synergism is assumed to proceed as follows: lubricants contained in phenolic resins enable organic chlorides to disperse uniformly into said phenolic resins and thus said organic chlorides enable phenolic resins to undergo thermal degradation uniformly, which results in accelerating the thermal decomposition reaction. Lubricants usable according to the present invention are ordinary ones, however preferable are ethylene bis-stearic amide, methylene bis-stearic amide, oxy-stearic amide, stearic amide and methylol stearic amide. Lubricant-containing phenolic resins can be obtained by adding said lubricant into phenolic resins at any stage of their preparation; prior to, during or after the reaction.

The incorporating proportion of said organic chlorides into a lubricant-containing phenolic resin is preferably 0.1 to 50 against 100 parts by weight; when the ratio is less than 0.1 parts by weight, it is difficult to obtain an excellent shake-out property. When the proportion is more than 50 parts by weight, it impairs the initial strength and curing characteristics of shell-molds.

Said organic chloride can be added at any time of preparation; prior to, during or after the reaction. Alternately, said organic chloride can be dispersed by mixing into ground phenolic resins after their preparation, or can be dispersed by melting in kneaders such as an extruder. Further, said organic chloride can be added into the production system of resin-coated sand during the production thereof at any time; prior to, during or after the addition of lubricant-containing phenolic resins.

The lubricant-containing phenolic resins used according to the present invention are any type of novolac resins, resole resins or a mixture thereof. Phenols for preparing said lubricant-containing phenolic resins are phenol, cresol and xylenol, and are usable in the presence of resorcin, cathecol, hydroquinone, aniline, urea, melaine, cashew nut shell oil, etc. Formaldehyde for preparing said lubricant-containing phenolic resins is selected from formalin, paraformaldehyde, trioxane, etc. Reaction catalysts of phenol and formaldehyde for preparing novolacs are acidic substances, generally such as oxalic, hydrochloric and sulfuric acid. Basic substances are generally selected from such as ammonia, triethylamine, sodium hydroxide, and barium hydroxide for resole type resin preparation.

The method for producing resin-coated sand used in the present invention is optional, hot-coating, semi-hot-coating, cold-coating, or powder-solvent coating, however, hot-coating is preferable.

The inventors hereof will explain the present invention with the following nonlimitative Examples and Comparative Examples, wherein "parts" and "percent" indicate "parts by weight" and "percent by weight", respectively.

PREPARATION EXAMPLES 1, 2, 3 AND 4

To each of four kettles with a reflux cooler and a stirrer, 1000 parts of phenol, 650 parts of 37% formalin and 10 parts of oxalic acid were added. The temperature of each kettle was gradually elevated, and when it reached 96° C., followed by reflux for 120 minutes, 10 parts of methylene bis-stearic amide and each following organic chlorides (I) to (IV) were added respectively to each of these kettles. After mixing, the reaction mixture was dehydrated under vacuum and dumped to obtain the respective lubricant-containing novolac type resins:

|  | Temperature for 20% of the heating loss (°C.) | Incorporated parts |
|---|---|---|
| (I) polyvinyl chloride resin "SUMILIT" SX-8 (product of Sumitomo Chemical Co., Ltd.) | 241 | 100 |
| (II) Chlorinated paraffin "BRENLIZER" FR-730 (product of Ajinomoto Co., Inc.) | 324 | 100 |
| (III) Chlorinated polyethylene "DIASOLAC" G-245 (product of Osaka Soda Co., Ltd.) | 315 | 150 |
| (IV) Cyclic organic chloride "DECHLORANE + PLUS" 515 (product of Hooker Chemical Corp.) | 342 | 100 |

PREPARATION EXAMPLES 5, 6, 7 AND 8

To each of four kettles with a reflux cooler and a stirrer, 1000 parts of phenol, 1795 parts of 37% formalin, 160 parts of 28% aqueous ammonia and 60 parts of 50% sodium hydroxide solution were charged. The temperature of each kettle was gradually elevated, and when it reached 96° C., followed by reflux for 30 minutes, 40 parts of ethylene bis-stearic amide and each of the following organic chlorides (V) to (VIII) were added respectively to each of these kettles. After mixing, the reaction mixtures were dehydrated under vacuum, dumped and rapidly cooled to obtain the respective resole type lubricant-containing phenolic resins:

|  | Temperature for 20% of the heating loss (°C.) | Incorporated parts |
|---|---|---|
| (V) Vinylchloride-vinylacetate "KANEVINYL" M-1008 (product of Kangafuchi Chemical Industry Co., Ltd.) | 250 | 220 |
| (VI) Chlorinated paraffin "EMPARA" 70 (product of Ajinomoto Co., Inc.) | 295 | 110 |
| (VII) Chlorinated polyethylene "DIASOLAC" MR-104 (product of Osaka Soda Co., Ltd.) | 325 | 165 |
| (VIII) Cyclic organic chloride "DECHLORANE + PLUS" 25 (product of Hooker Chemical Corp.) | 350 | 110 |

PREPARATION EXAMPLE 9

To a kettle with a reflux cooler and a stirrer, 1000 parts of phenol, 650 parts of 37% formalin and 10 parts of oxalic acid were charged. The temperature of the kettle was gradually elevated, and when it reached 96° C., followed by refluxing for 120 minutes, 10 parts of methylene bis-stearic amide and 100 parts of the following organic chloride (IX) were added thereto. After mixing, the reaction mixture was dehydrated under vacuum and dumped to obtain a lubricant-containing novolac type phenolic resin:

|  | Temperature for 20% of the heating loss (°C.) |
|---|---|
| (IX) Sodium hypochlorite | 110 |

PREPARATION EXAMPLES 10, 11 AND 12

To each of three kettles with a reflux cooler and a stirrer, 1000 parts of phenol, 650 parts of 37% formalin, and 10 parts of oxalic acid were charged. The temperature of each kettle was gradually elevated, and when it reached 96° C., followed by refluxing for 120 minutes, 10 parts of methylene bis-stearic amide, and 0, 0.5 and 680 parts of organic chloride (I) were added to each of three kettles. After mixing, the reaction mixtures were dehydrated under vacuum and dumped to obtain lubricant-containing, novolac type phenolic resins, respectively.

PREPARATION EXAMPLE 13

To a kettle with a reflux cooler and a stirrer, 1000 parts of phenol, 1705 parts of 37% formalin, 160 parts of 28% aqueous ammonia, and 60 parts of 50% sodium hydroxide solution were added. The temperature of the mixture was gradually elevated. When the temperature reached 96° C., refluxing continued for 30 minutes, 40 parts of ethylene bis-stearic amide was added. After dehydration under vacuum, it was dumped from the kettle, and cooled rapidly, to obtain a lubricant-containing resole type phenolic resin.

EXAMPLE 1

Preheated at 130° to 140° C., 7000 parts of Sanei No. 6 silica sand were charged into a whirl-mixer. After adding 140 parts of lubricant-containing novolac type phenolic resin obtained according to Preparation Example 1 thereto, it was mixed for 40 seconds, and 21 parts of hexamethylene tetramine dissolved in 105 parts of water were added thereto. The mixture was further mixed until it crumbled. 7 parts of calcium stearate was added thereto, and after 30 seconds mixing, discharged and aerated to obtain a coated sand composition.

EXAMPLE 2

Except for using lubricant-containing novolac type phenolic resin obtained according to Preparation Example 2, a coated sand composition was obtained by the same method and conditions as Example 1.

EXAMPLE 3

Except for using lubricant-containing novolac type phenolic resin obtained according to Preparation Example 3, a coated sand composition was obtained by the same method and conditions as Example 1.

EXAMPLE 4

Except for using lubricant-containing novolac type phenolic resin obtained according to Preparation Example 4, a coated sand composition was obtained by the same method and conditions as Example 1.

EXAMPLE 5

Preheated at 130° to 140° C. 7000 parts of Sanei No. 6 silica sand were charged into a whirl-mixer. After adding 140 parts of lubricant-containing resole type phenolic resin obtained according to Preparation Example 5 thereto, it was mixed for 40 seconds, and 105 parts of cooling water was added thereto. The mixture was further mixed until it crumbled. 7 parts of calcium stearate were added thereto, mixed for 30 seconds, discharged and aerated to obtain a coated and composition.

EXAMPLE 6

Except for using lubricant-containing resole type phenolic resin obtained according to Preparation Example 6, a coated sand composition was obtained by the same method and conditions as Example 5.

EXAMPLE 7

Except for using lubricant-containing resole type phenolic resin obtained according to Preparation Example 7, a coated sand composition was obtained by the same method and conditions as Example 5.

EXAMPLE 8

Except for using lubricant-containing resole type phenolic resin obtained according to Preparation Example 8, a coated sand composition was obtained by the same method and conditions as Example 5.

EXAMPLE 9

Preheated at 130° to 140° C., 7000 parts of Sanei No. 6 silica sand were charged into a whirl-mixer and 130 parts of lubricant-containing novolac type phenolic resin obtained according to Preparation Example 7 were added thereto. Followed by 20 seconds mixing, 13 parts of organic chloride (I) was added thereto. After mixing for 20 seconds, 21 parts of hexamethylene tetramine dissolved in 105 parts of water was added thereto. The mixture was further mixed until it crumbled. 7 parts of calcium stearate was added thereto, followed by 30 seconds mixing, the mixture was discharged and aerated to obtain a coated sand composition.

EXAMPLE 10

Except for using organic chloride (II), a coated sand composition was obtained by the same method and conditions as Example 9.

EXAMPLE 11

Preheated at 130° to 140° C., 7000 parts of Sanei No. 6 silica sand were charged into a whirl-mixer. After adding 13 parts of organic chloride (I) thereto, it was mixed for 20 seconds. 78 parts of lubricant-containing novolac type phenolic resin according to Preparation Example 10 and 52 parts of lubricant-containing resole type phenolic resin according to Preparation Example 13 were added, and mixed for 20 seconds. Then, 13 parts of hexamethylene tetramine dissolved in 63 parts by weight of water were added thereto. The mixture was mixed well until it crumbled. After 7 parts of calcium stearate were added thereto, mixed for 30 seconds, discharged and aerated to obtain a coated sand composition.

EXAMPLE 12

Except for using organic chloride (II), a coated sand composition was obtained by the same method and conditions as Example 11.

COMPARATIVE EXAMPLE 1

Preheated at 130° to 140° C., 7000 parts of Sanei No. 6 silica sand were charged into a whirl-mixer. After adding 140 parts of novolac type phenolic resin obtained according to Preparation Example 9 thereto, it was mixed for 40 seconds, and 21 parts of hexamethylene tetramine dissolved in 105 parts of water were added thereto. The mixture was mixed until it crumbled. 7 parts of calcium stearate were added thereto, mixed for 30 seconds, discharged and aerated to obtain a coated sand composition.

COMPARATIVE EXAMPLE 2

Except for using lubricant-containing novolac type phenolic resin obtained according to Preparation Example 10, a coated sand composition was obtained by the same method and conditions as Comparative Example 1.

COMPARATIVE EXAMPLE 3

Except for using lubricant-containing novolac type phenolic resin obtained according to Preparation Example 11, a coated sand composition was obtained by the same method and conditions as Comparative Example 1.

COMPARATIVE EXAMPLE 4

Except for using lubricant-containing novolac type phenolic resin obtained according to Preparation Example 4, a coated sand composition was obtained by the same methods and conditions as Example 1.

COMPARATIVE EXAMPLE 5

Preheated at 130° to 140° C., 7000 parts of Sanei No. 6 silica sand were charged into a whirl-mixer. After adding 140 parts of lubricant-containing resole type phenolic resin obtained according to Comparative Example 4, it was mixed for 40 seconds, and 105 parts of cooling water were added thereto. The mixture was mixed until it crumbled. 7 parts of calcium stearate were added thereto, mixed for 30 seconds, discharged and aerated to obtain a coated sand composition.

Table 1 indicates the characteristics of various kinds of coated sand composition obtained according to Examples 1, 2, 3, 4, 5, 6, 7, 8, 9, 10, 11, and 12, and Comparative Examples 1, 2, 3, 4 and 5 as well as the shake-out property of shell-molds therefrom.

TABLE 1

| | | | Example | | | | | | | |
|---|---|---|---|---|---|---|---|---|---|---|
| | | | 1 | 2 | 3 | 4 | 5 | 6 | 7 | 8 |
| Preparation Example | | | 1 | 2 | 3 | 4 | 5 | 6 | 7 | 8 |
| Organic chloride incorporated | | | I | II | III | IV | V | VI | VII | VIII |
| Incorporating proportion of organic chloride in 100 parts of lubricant-containing phenolic resin (parts) | | | 10 | 10 | 15 | 10 | 20 | 10 | 15 | 10 |
| Coated sand composition | Stick point (°C.) | | 102 | 102 | 102 | 102 | 100 | 99 | 100 | 100 |
| Shell-mold | Bending strength (Kg/cm$^2$) | | 30.6 | 30.7 | 30.5 | 30.6 | 28.6 | 27.4 | 27.9 | 29.0 |
| | Tensile strength under heat (Kg/cm$^2$) at 250° C. | 30 sec. | 2.5 | 2.6 | 2.4 | 2.5 | 1.8 | 1.7 | 1.9 | 1.8 |
| | | 45 sec. | 5.1 | 5.0 | 4.9 | 5.0 | 2.9 | 3.0 | 2.9 | 2.9 |
| | | 60 sec. | 8.3 | 8.2 | 8.1 | 8.3 | 6.4 | 6.3 | 6.4 | 6.2 |
| | Shake-out property (times) | | 11 | 10 | 11 | 11 | 9 | 8 | 9 | 9 |

| | | | Example | | | | Comparative Example | | | | |
|---|---|---|---|---|---|---|---|---|---|---|---|
| | | | 9 | 10 | 11 | 12 | 1 | 2 | 3 | 4 | 5 |
| Preparation Example | | | 10 | 10 | 10 + 13 | 10 + 13 | 9 | 10 | 11 | 12 | 13 |
| Organic chloride incorporated | | | I | II | I | II | IX | — | I | I | — |
| Incorporating proportion of organic chloride in 100 parts of lubricant-containing phenolic resin (parts) | | | 10 | 10 | 10 | 10 | 10 | 0 | 0.05 | 70 | 0 |
| Coated sand composition | Stick point (°C.) | | 102 | 102 | 100 | 100 | 102 | 102 | 102 | 105 | 98 |
| Shell-mold | Bending strength (Kg/cm$^2$) | | 30.5 | 30.6 | 30.0 | 29.8 | 11.4 | 31.1 | 31.0 | 7.3 | 29.1 |
| | Tensile strength under heat (Kg/cm$^2$) at 250° C. | 30 sec. | 2.5 | 2.5 | 2.1 | 2.2 | 1.0 | 2.5 | 2.6 | 0.3 | 2.0 |
| | | 45 sec. | 5.1 | 5.0 | 4.0 | 4.1 | 2.1 | 5.2 | 5.1 | 1.4 | 3.1 |
| | | 60 sec. | 8.4 | 8.3 | 7.3 | 7.4 | 4.3 | 8.2 | 8.2 | 1.5 | 6.5 |
| | Shake out property (times) | | 11 | 10 | 10 | 9 | 22 | 31 | 31 | 4 | 27 |

Test Methods

Bending strength: according to JACT Method SM-1
Stick point: according to JACT Method C-1
Tensile strength under elevated temperature: according to JACT Method SM-10.

Shake-out property

Preparation of specimen: Coated sand is fed into an iron pipe of 29 mm in diameter and 150 mm in length. After 30 minutes baking, it is covered with aluminum foil and further heated for 3 hours at 370° C. After cooling, the sand molded pipe is taken out.

Test method The specimen is flogged by the impact arm of the apparatus illustrated in FIG. 1. Crumbled sand is removed from the pipe after each flogging. Weighing the residual molded sand of the specimen until it becomes zero, and the shake-out property is defined by the number of floggings thereof.

Test apparatus In FIG. 1, A is a molded sand specimen and B is the arm which revolves around pivot C set at 30 cm high. Said arm is at first set horizontally, and then allowed to drop so as to flog said specimen.

What is claimed is:

1. A resin-coated foundry sand for shell-molding operations comprising foundry aggregates coated with a lubricant-containing phenolic resin and one or more organic chlorides, said chlorides characterized by a 20% weight of heating loss in the range of 130°–550° C. said organic chlorides selected from:

(a) chlorine containing polymers having the following formula in the main chain:

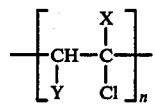

where:
X is selected from H, Cl and alkyl group
Y is selected from H, Cl, phenyl and alkyl group
n is an integer, 2 or greater, or (b) cyclo-organic chloride compounds; and the proportion of organic chlorides to lubricant-containing phenolic resin is from about 0.1 part to about 50 parts organic chlorides to 100 parts phenolic resin.

2. A resin-coated foundry sand according to claim 1, wherein the chlorine-containing polymers are selected from polyvinyl chloride resins or PVC-copolymer resins.

3. A resin-coated foundry sand according to claim 1, wherein the chlorine-containing polymers are chlorinated paraffins.

4. A resin-coated foundry sand according to claim 1, wherein the chlorine-containing polymers are chlorinated polyolefins.

5. A resin-coated foundry sand according to claim 1, wherein the cyclo-organic compound is dodecachloro-dodecahydrodimethone-benzo cyclo-octene.

6. A resin-coated foundry sand according to claim 1, wherein the lubricant-containing phenolic resin is a novolac phenolic resin.

7. A resin-coated foundry sand according to claim 1, wherein the lubricant-containing phenolic resin is a resole phenolic resin.

8. A resin-coated foundry sand according to claim 1, wherein the lubricant-containing phenolic resin is a mixture of a novolac and a resole phenolic resin.

9. A method for producing resin-coated foundry sand comprising coating foundry aggregates with a lubricant-containing phenolic resin and one or more organic chlorides, said organic chloride characterized by a 20% weight of heating loss in the range of 130°–550° C., said organic chlorides selected from:

(a) chlorine containing polymers having the following in the main chain:

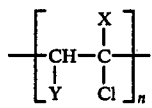

wherein:
X is selected from H, Cl and alkyl groups
Y is selected from H, Cl, phenyl and alkyl group
n is an integer, 2 or greater, or (b) cyclo-organic chloride compounds; and the proportion of organic chlorides to lubricant-containing phenolic resin is from about 0.1 part to about 50 parts organic chlorides to 100 parts phenolic resin.

10. A method for producing resin-coated foundry sand according to claim 9, wherein the chlorine-containing polymers are selected from polyvinylchloride resins and PVC-copolymer resins.

11. A method for producing resin-coated foundry sand according to claim 9, wherein the chlorine-containing polymers are chlorinated paraffins.

12. A method for producing resin-coated foundry sand according to claim 9, wherein the chlorine-containing polymers are chlorinated polyolefins.

13. A method for producing resin-coated foundry sand according to claim 9, wherein the cyclo-organic compound is dodecachloro-dodecahydro-dimethone-dibenzo cyclo-octene.

14. A method for producing resin-coated foundry sand according to claim 9, wherein the lubricant-containing phenolic resin is a novolac phenolic resin.

15. A method for producing resin-coated foundry sand according to claim 10, wherein the lubricant-containing phenolic resin is a novolac phenolic resin.

16. A method for producing resin-coated foundry sand according to claim 11, wherein the lubricant-containing phenolic resin is a novolac phenolic resin.

17. A method for producing resin-coated foundry sand according to claim 12, wherein the lubricant-containing phenolic resin is a novolac phenolic resin.

18. A method for producing resin-coated foundry sand according to claim 13, wherein the lubricant-containing phenolic resin is a novolac phenolic resin.

19. A method for producing resin-coated foundry sand according to claim 9, wherein the lubricant-containing phenolic resin is a resole phenolic resin.

20. A method for producing resin-coated foundry sand according to claim 10, wherein the lubricant-containing phenolic resin is a resole phenolic resin.

21. A method for producing resin-coated foundry sand according to claim 11, wherein the lubricant-containing phenolic resin is a resole phenolic resin.

22. A method for producing resin-coated foundry sand according to claim 12, wherein the lubricant-containing phenolic resin is a resole phenolic resin.

23. A method for producing resin-coated foundry sand according to claim 13, wherein the lubricant-containing phenolic resin is a resole phenolic resin.

24. A method for producing resin-coated foundry sand according to claim 9, wherein the lubricant coated phenolic resin is a mixture of a novolac and a resole phenolic resin.

25. A method for producing resin-coated foundry sand according to claim 10, wherein the lubricant coated phenolic resin is a mixture of a novolac and a resole phenolic resin.

26. A method for producing resin-coated foundry sand according to claim 11, wherein the lubricant coated phenolic resin is a mixture of a novolac and a resole phenolic resin.

27. A method for producing resin-coated foundry sand according to claim 12, wherein the lubricant coated phenolic resin is a mixture of a novolac and a resole phenolic resin.

* * * * *